(12) United States Patent
Redekop

(10) Patent No.: US 9,763,378 B2
(45) Date of Patent: Sep. 19, 2017

(54) WINGED AGRICULTURAL IMPLEMENT

(71) Applicant: Johan Redekop, Winkler (CA)

(72) Inventor: Johan Redekop, Winkler (CA)

(*) Notice: Subject to any disclaimer, the term of this patent is extended or adjusted under 35 U.S.C. 154(b) by 180 days.

(21) Appl. No.: 14/253,970

(22) Filed: Apr. 16, 2014

(65) Prior Publication Data
US 2015/0296700 A1    Oct. 22, 2015

(51) Int. Cl.
*A01B 73/06* (2006.01)

(52) U.S. Cl.
CPC .................. *A01B 73/067* (2013.01)

(58) Field of Classification Search
CPC .................................... A01B 73/067
USPC .......................................... 172/311
See application file for complete search history.

(56) References Cited

U.S. PATENT DOCUMENTS

| | | | | |
|---|---|---|---|---|
| 2,405,980 A * | 8/1946 | Sands et al. | ........... | B60D 1/465 172/11 |
| 3,566,974 A * | 3/1971 | Kopaska | ............. | A01B 17/004 172/202 |
| 3,935,696 A * | 2/1976 | Pavel | .................. | A01B 73/067 172/311 |
| 4,042,044 A * | 8/1977 | Honnold | ............. | A01B 73/067 172/311 |
| 4,056,149 A * | 11/1977 | Honnold | ............. | A01B 73/067 172/311 |
| 4,126,187 A * | 11/1978 | Schreiner | ............. | A01B 73/067 172/311 |
| 4,191,280 A * | 3/1980 | Copperwheat | ....... | A01B 59/004 172/439 |
| 4,724,910 A * | 2/1988 | Wheeler | ............. | A01B 61/046 172/178 |
| 4,893,682 A * | 1/1990 | Smallacombe | ........ | A01B 21/04 172/311 |
| 4,896,732 A * | 1/1990 | Stark | ...................... | A01B 73/02 172/311 |
| 4,930,580 A * | 6/1990 | Fuss | ........................ | A01G 3/062 172/15 |
| 5,415,235 A * | 5/1995 | Gebauer | ............. | A01B 59/048 172/272 |
| 7,819,202 B2 * | 10/2010 | Hulicsko | .............. | A01B 73/067 172/311 |

(Continued)

FOREIGN PATENT DOCUMENTS

GB       2110061 A  *  6/1983  ............. A01B 63/22

*Primary Examiner* — Thomas B Will
*Assistant Examiner* — Joel F. Mitchell
(74) *Attorney, Agent, or Firm* — Ryan W. Dupuis; Kyle R. Satterthwaite; Ade + Company Inc.

(57) ABSTRACT

In a winged agricultural implement having two wing frame sections pivotal relative to a center frame section between a laterally extending working position and a rearward trailing transport position, two brace members are pivotally supported on the center frame section to selectively retain and support the wing frame sections in the working position. A hydraulic actuator pivots each brace member between a latched position and a released position relative to the wing frame section. A biasing linkage is provided in series with each hydraulic actuator to provide positive pressure to retain the brace member in a latched position as the wing frame section pivotally floats relative to the center frame section during movement across an agricultural field in a forward working direction.

18 Claims, 5 Drawing Sheets

(56) References Cited

U.S. PATENT DOCUMENTS

| | | | |
|---|---|---|---|
| 8,291,994 B2* | 10/2012 | Hulicsko | A01B 29/02 |
| | | | 172/311 |
| 2008/0314605 A1 | 12/2008 | Degelman et al. | |
| 2010/0307780 A1 | 12/2010 | Hulicsko | |
| 2011/0265699 A1 | 11/2011 | McCrea | |
| 2014/0262376 A1* | 9/2014 | Redekop | A01B 29/02 |
| | | | 172/286 |

* cited by examiner

WINGED AGRICULTURAL IMPLEMENT

FIELD OF THE INVENTION

The present invention relates to an agricultural implement comprising a pair of wing sections which are foldable relative to one another from a laterally extending working position to a trailing transport position, and more particularly the present invention relates to a winged agricultural implement having a novel bracing assembly for selectively bracing the wing sections in the working position.

BACKGROUND

Various agricultural implements are known to be provided with a center section and a pair of wing sections which extend laterally outward from opposing sides of the center section in a working position, but which are foldable relative to one another from the working position to a trailing transport position to reduce overall width of the implement for transport.

A land roller implement is one common example of winged agricultural implements, used for levelling land, pushing rocks down into the soil, breaking up soil mounds and clods, or packing seed for example. Similar to other winged implements, it is common to provide a brace assembly which is connected between the center section and the wing sections to provide additional support to retain the wing sections in their working orientation as the implement is advanced across an agricultural field.

United States Patent Application Publication Nos. 2008/0314605 by Degelman et al and 2010/0307780 by Hulicsko disclose examples of land roller implements comprising a center roller section and two wing sections carrying two roller section in each wing section. In each instance a brace structure is provided which is pivoted into a latched position using a linkage responsive to the folding of the wing sections into the working position. An additional latching mechanism must be operated into a latching arrangement however to retain the brace in the latched position. Furthermore, the linkage arrangement does not allow the brace to pivot relative to the center frame section about an axis coincident with the floating axis of the wing sections relative to the center section, which places undesirable stresses on the bracing assembly.

Canadian Patent Application No. 2,810,124 and U.S. patent application Ser. No. 13/826,712 by Johan Redekop discloses another example of a land roller implement having a brace latched by a linkage similarly to Degelman et al and Hulicsko noted above, but with the pivot axis of the brace member relative to the main section being relocated to be coincident with the floating axis of the respective wing section.

United States Patent Application Publication No. 2011/0265699 by McCrea et al discloses another example of a land roller implement including a brace structure which is pivotally supported on the wing section for pivoting into a latched position between a center roller section and two wing sections. No additional mechanism is provided which positively retains the brace in its latched position as the wing sections are pivotally floated relative the main section during forward movement across an agricultural field. Furthermore, the brace accordingly to McCrea et al similarly does not allow the brace to pivot relative to the center frame section about an axis coincident with the floating axis of the wing sections relative to the center section, which places undesirable stresses on the bracing assembly.

SUMMARY OF THE INVENTION

According to one aspect of the present invention there is provided a winged agricultural implement arranged to be towed in a forward working direction by a towing vehicle, the implement comprising:

a center frame section arranged for connection to the towing vehicle;

a pair of wing frame sections having respective inner ends which are pivotally coupled at laterally opposing sides of the center frame section for movement between a working position extending laterally outwardly in opposing directions from the center frame section and a transport position trailing rearwardly from the center frame section;

at least one ground engagement member supported on each frame section so as to be arranged to engage the ground as the implement is towed in the forward working direction;

a pair of brace members pivotally supported on the center frame section at the laterally opposing sides respectively;

a first latching element supported on each brace member;

a second latching element supported on each wing section so as to be arranged to be selectively engaged by the first latching element of a respective one of the brace members;

a pair of hydraulic actuators operatively connected between the center frame section and respective ones of the brace members, each hydraulic actuator being operable in a respective longitudinal direction of the hydraulic actuator between an extended position and a retracted position, wherein:

the respective first and second latching elements are engaged to retain the respective wing frame section in the working position in one of the extended position or the retracted position; and the first latching element is released from the second latching element such that the respective wing frame section is pivotal from the working position to the transport position in another one of the extended position or the retracted position; and a pair of biasing linkages associated with the hydraulic actuators respectively, wherein:

each biasing linkage is connected in series with the respective hydraulic actuator between the center frame section and the respective brace member;

each biasing linkage is operable between a first position and a second position in which an overall effective length of the biasing linkage and the hydraulic actuator between the center frame section and the respective brace member is longer in the second position than in the first position; and each biasing linkage is biased from one of the first position or the second position towards another one of the first position or the second position in a direction such that the respective brace member is biased towards the latched position.

The connection of hydraulic actuators of the brace members using biasing linkages as described herein, provides a simple structure which maintains positive pressure to retain the latching elements engaged in a latched position of the brace members, without requiring an additional latching mechanism to be operated between open and closed position. Accordingly the brace members can be pivoted with the wing sections through a large range of angles relative to the center section as the implement is advanced across an agricultural field, without concern of the bracing members being inadvertently released, despite the absence of any additional latching mechanism.

Preferably each biasing linkage comprises a sliding element which is linearly slidable between the first position and the second position of the biasing linkage.

Preferably each biasing linkage is linearly slidable in the longitudinal direction of the respective hydraulic actuator.

Preferably each brace member is in the latch position in the extended position of the respective hydraulic actuator, and each biasing linkage is biased from the first position towards the second position thereof.

Preferably each biasing linkage includes a spring element which is oriented to provide biasing force in the longitudinal direction of the respective hydraulic actuator.

Preferably each biasing linkage is substantially centered between the first and second positions in the latched position of the brace members when the wing frame sections are level with the center frame section at a common horizontal elevation.

When each wing frame section is pivotal relative to the center frame section in the working position thereof about a floating axis oriented generally in the forward working direction, preferably each hydraulic actuator is arranged to be locked in the extended position in the latched position of the brace members as the wing frame sections are pivotally displaced relative the center section about the respective floating axes. Preferably the extended position of each hydraulic actuator corresponds to the actuator being fully extended.

Preferably each brace member is pivotal relative to the center frame sections about a brace axis which is coaxial with the floating axis of the respective wing frame section. In this instance, each first latching element may be arranged to engage the respective second latching element non-rotatably in the latched position of the respective brace member.

Preferably one of the first latching element and the second latching element comprises a pin and another one of the first latching element and the second latching element comprises a slot which receives the pin therein in the latched position of each brace member. In this instance, each pin is preferably retained in the respective slot in the latched position of the respective brace member solely by the biasing of the respective biasing linkage.

Each biasing linkage may comprise a housing element, a sliding element which is supported for linear sliding movement relative to the housing element, and a spring element coupled between the housing element and the sliding element so as to provide biasing force to the sliding element in a direction of the linear sliding movement, the spring element being fully enclosed within the housing element.

Preferably each biasing linkage is mounted between the respective hydraulic actuator and the center frame section.

When in the latched position, preferably each brace member comprises: i) a front arm portion extending laterally outwardly from an inner end of the front arm portion pivotally coupled to the center frame section at a front side of the center frame section; ii) a rear arm portion extending laterally outwardly from an inner end of the rear arm portion pivotally coupled to the center frame section at a rear side of the center frame section; and iii) at least one cross member joined between the front arm portion at a front side of the brace member and the rear arm portion at a rear side of the brace member.

In this instance the implement may further comprise a wear plate formed of non-metallic material associated with each brace member in which the wear plate is mounted on one of the center frame section or the front arm portion of the respective brace member so as to be oriented transversely to the forward working direction in engagement between the center frame section and the front arm portion in the latched position.

In the illustrated embodiment said at least one ground engagement member comprises a roller arranged to level ground such that the overall winged agricultural implement comprises a land roller implement.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
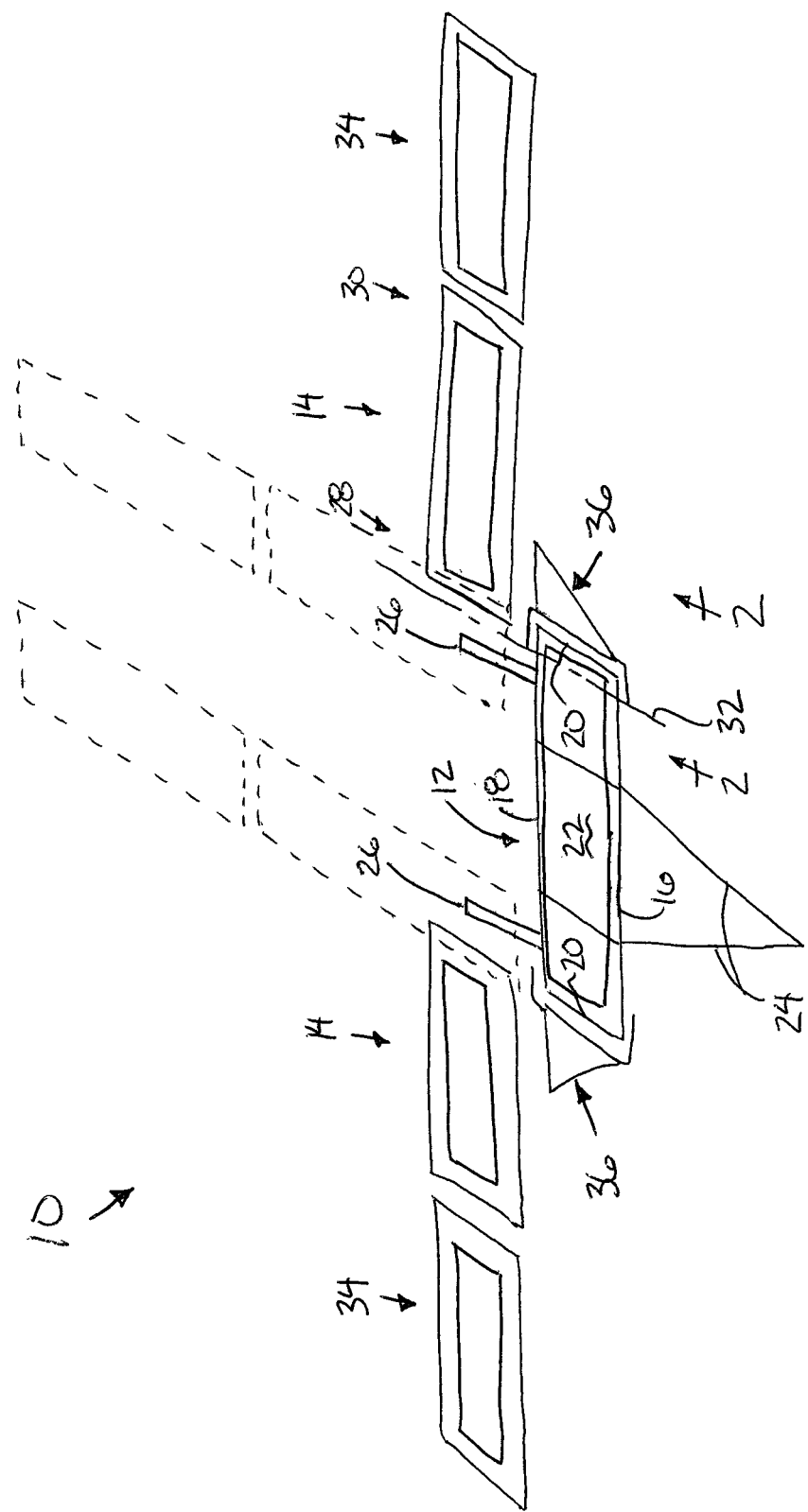
FIG. 1 is a perspective view of a schematic representation of a winged land roller implement according to the present invention.
Figure 2:
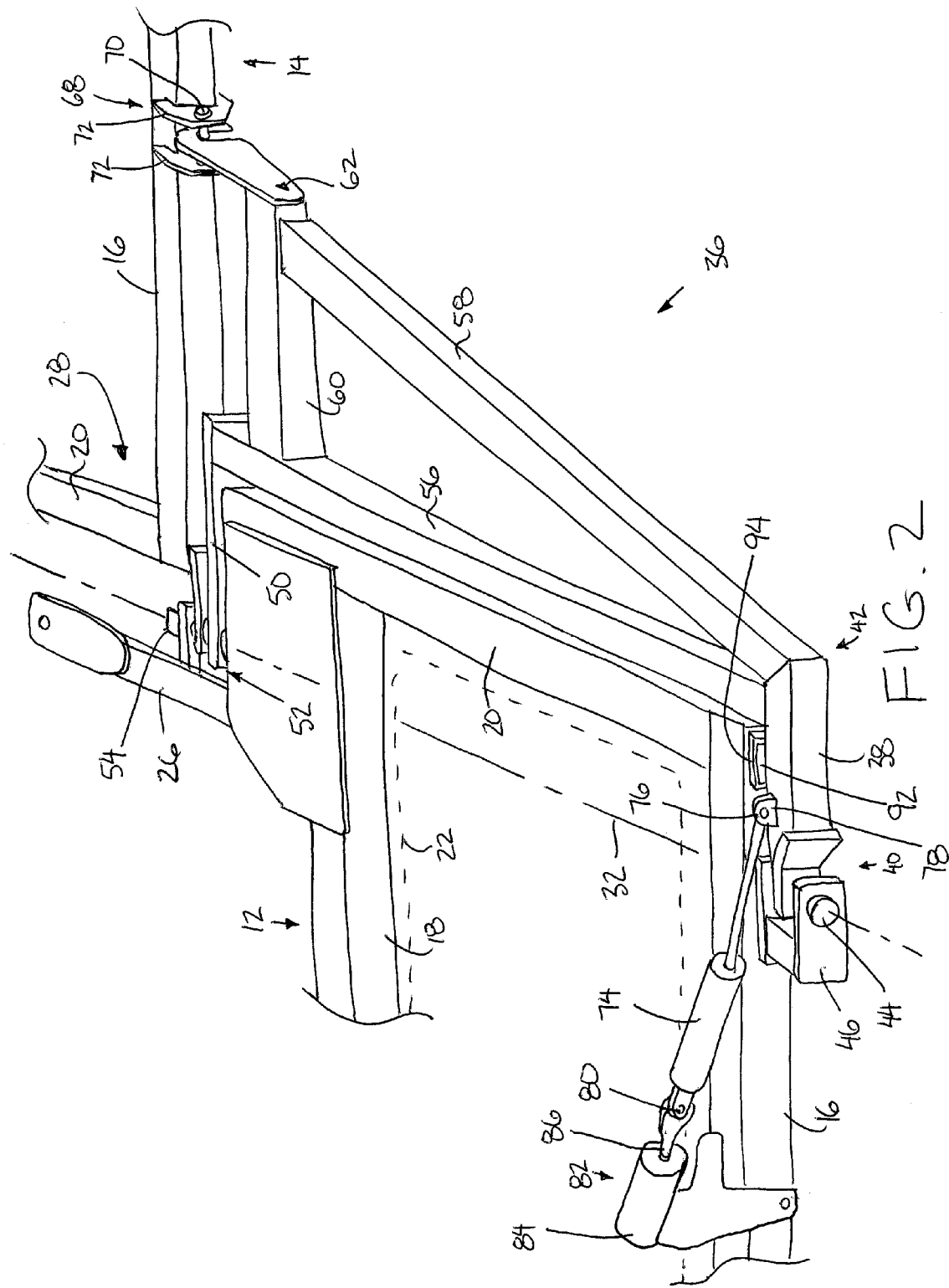
FIG. 2 is an enlarged perspective view along the line 2-2 of FIG. 1 illustrating a brace portion of the winged land roller implement.
Figure 3:
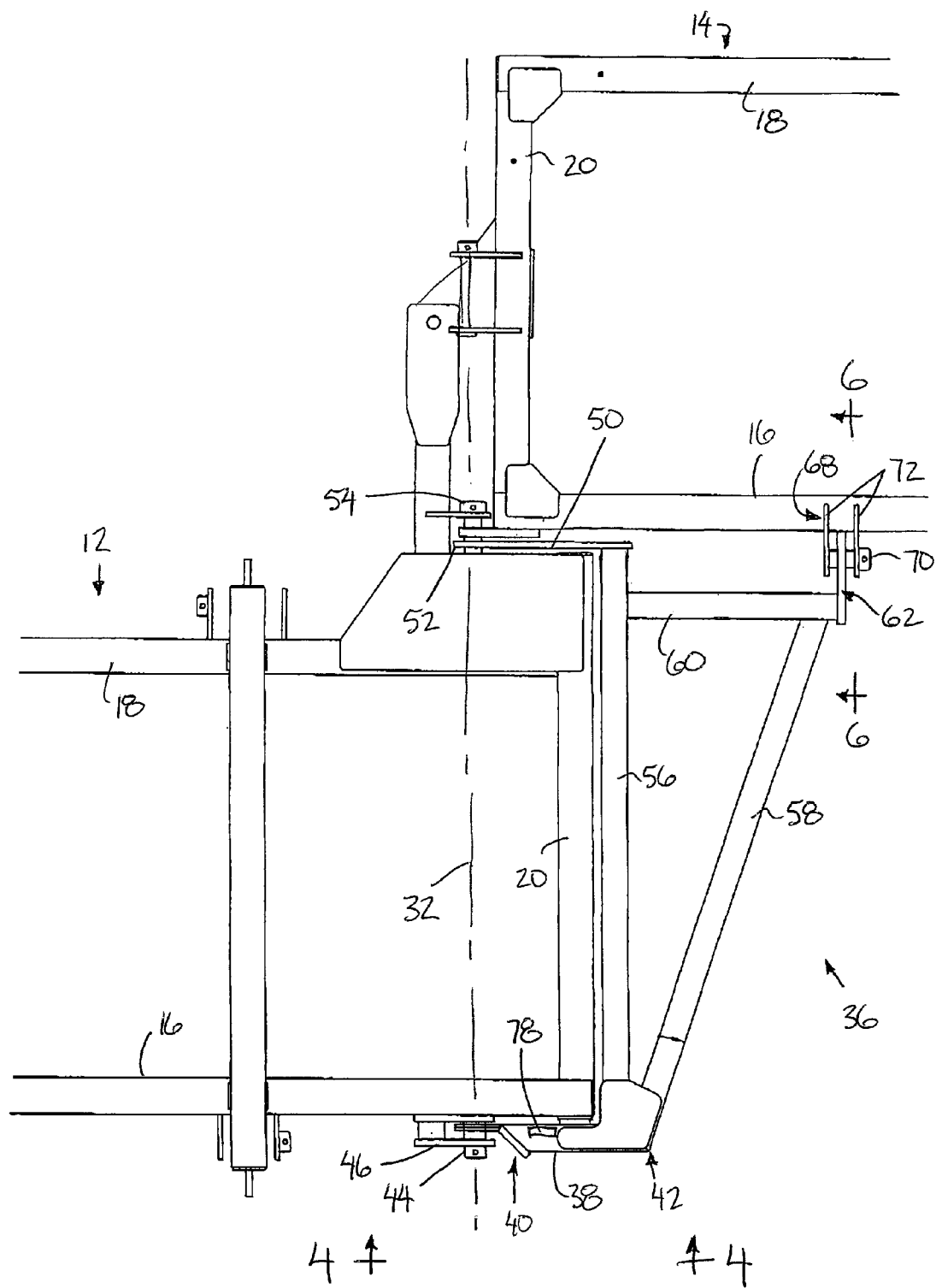
FIG. 3 is a top plan view of the brace portion of the winged land roller implement.
Figure 4:
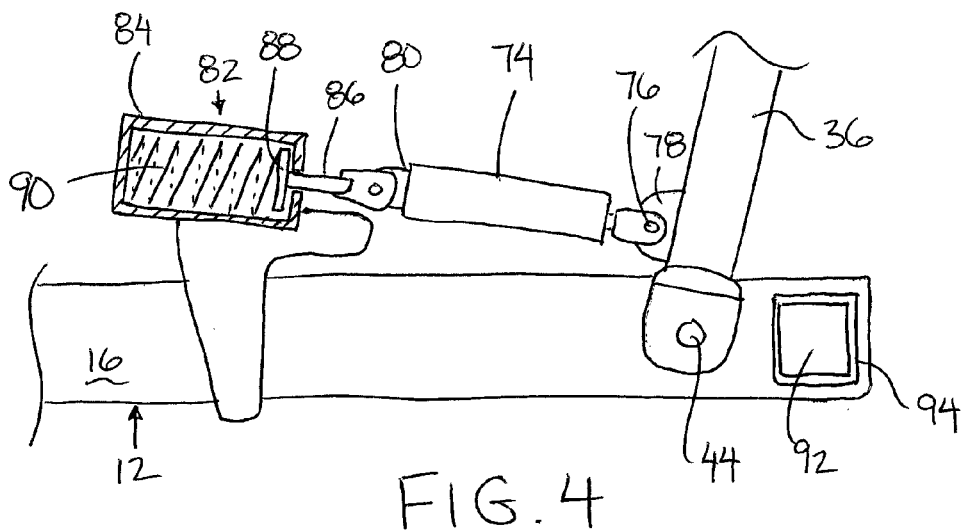
FIG. 4 is a front elevational view of the brace portion along the line 4-4 of FIG. 3 in a latched position.

Referring to the accompanying figures, there is illustrated a winged agricultural implement generally indicated by reference numeral 10. The implement 10 is suited for use with a towing vehicle for being towed across an agricultural field in a forward working direction. In the illustrated embodiment, the implement comprises an agricultural land roller for rolling across the ground to level mounds, to push rocks down into the ground, and the like as it is towed across the field in the forward working direction.

The implement 10 includes a center frame section 12 and two wing frame sections 14 which are pivotally coupled at laterally opposing sides of the center frame section. The two wing frame sections 14 are each pivotal about an upright pivot axis between a working position (shown in solid line in FIG. 1) in which the two wing frame sections extend laterally outward in opposing directions from the center frame section so as to span perpendicularly to the forward direction, and a transport position (shown in broken line in FIG. 1) in which the two wing frame sections extend rearwardly in a trailing configuration relative to the center frame section.

Each frame section includes a front beam 16 extending horizontally across the front side of the frame section, and a rear beam 18 spanning horizontally at a rear of the frame section parallel and spaced behind the front beam 16. Two end members 20 extend in the forward direction at each of the laterally opposed sides of the frame section to connect between the ends of the front and rear beams respectively. Each frame section is thus generally rectangular in shape and extends in a perimeter configuration about a respective roller 22 rotatably supported therein about a respective roller axis oriented perpendicularly to the forward direction in the working position.

The center frame section 12 more particularly includes hitching arms 24 which extend forwardly from the front beam 16 thereof for connection to the towing vehicle. At the rear side, a pair of wing connecting arms 26 extend rearwardly from the rear beam 18 in proximity to the laterally opposing sides of the center frame section respectively. A wing pivot connector is provided at the rear end of each wing connector arm 26 to locate the vertical pivot axis about which the winged frame sections are pivotal between working and transport positions.

Each wing frame section extends longitudinally between an inner end 28 pivotally coupled to the center frame section and opposing outer end 30. In the transport position, the wing frame sections extend rearward in their respective longitudinal directions from the inner end to the outer end. In the transport position, the longitudinal directions of the wing frame sections extend laterally outward from the inner ends to the outer ends such that the longitudinal direction of the wing frame sections are perpendicular to the forward working direction in the working position.

The wing frame sections are also arranged for pivotal movement about respective horizontal floating axes respectively which are defined by the wing pivot connections at the rear end of the wing connector arms 26 of the center frame section. The floating axis of each wing frame section is located at the inner end of the frame section to be parallel to the forward working direction such that the outer ends of the wing frame sections are displaced upwardly and downwardly relative to the center frame section as the implement is towed across a field and variations in the ground contours cause the wing frame sections to pivot relative to the center frame section about the floating axes respectively.

In the working position, the wing frame sections 14 are latched relative to the center frame section to retain the wing frame sections in the working position and prevent relative pivotal movement therebetween about the vertical pivot axes while permitting the wing frame sections to continue to float for relative pivotal movement about the respective horizontal floating axes.

In some embodiments, auxiliary frame sections 34 may be hinged to the outer ends of the two wing frame sections 14 in which the auxiliary frame sections 34 have a similar configuration of a front beam, rear beam and end members supporting a roller therein. The auxiliary frame sections are pivotally coupled at their inner ends to the outer ends of the two wing frame sections 14 respectively for relative pivotal movement about a respective horizontal floating axis oriented in the forward working direction when the wing frame sections are latched in the working position. The outer auxiliary frame sections 34 are thus permitted to change in elevation and inclination relative to the outer frame sections as the implement is displaced over varying ground contours similarly to the two wing frame sections described above.

The two wing frame sections 14 are latched into the respective working positions using a pair of brace members 36 associated with the two wing frame sections respectively. Each brace member is pivotally supported on the center frame section adjacent respective ones of the laterally opposing sides of the center frame section. Each brace member 36 is pivotal between a released position extending generally upwardly and disengaged from the respective wing section and a latched position in latching engagement with the respective wing frame section to retain the wing frame section in the working position.

In the latched position of the brace member 36, the brace member includes a front arm portion 38, which extends generally horizontally outward from an inner end 40 pivotally coupled on the center frame section at the front side thereof to an outer end 42 projecting laterally outward beyond the end of the center frame section. The inner end of the frame portion includes a vertical plate integral with the remainder of the front arm portion which is perpendicular to the forward working direction and which locates an aperture therein through which a hinge pin 44 is received to define the pivotal connection of the front arm portion to the center frame section. The hinge pin 44 projects forwardly from the front beam of the center frame section and is retained at the forward end by a support plate 46 which is also fixed relative to the center frame section. The plate forming the inner end of the front arm portion 38 is thus received pivotally on the hinge pin 44 between the front side of the front beam 16 and the support plate 46.

The brace member also includes a first rear arm portion 50 which similarly extends horizontally and laterally outwardly from an inner end 52 pivotally coupled at the rear side of the center frame section towards an opposing outer end 54. The rear arm portion similarly is formed of an upright plate having an aperture at the inner end thereof which receives a pivot shaft 54 therethrough. The pivot shaft 54 projects rearwardly from the rear side of the center frame section parallel to the forward working direction of the implement. The inner end of the respective wing frame section may also be engaged with the pivot shaft 54 rearwardly of the brace member such that the pivot shaft 54 also partially defines the floating axis of the wing frame section relative to the center frame section. The inner ends of both the front arm portion and rear arm portion are pivotal relative to the center frame section about a respective brace axis of the brace member which is coaxial with the horizontal floating axis of the corresponding wing section such that the wing frame section 14 and the respective brace member are pivotal together about a common float axis as the implement is towed over varying ground contours in the forward working direction.

The brace member further includes a first cross member 56, which is parallel to the working direction of the implement and which extends rearwardly from the outer end of the front arm portion 38 for connection to the corresponding outer end of the first rear arm portion 50. A second cross member 58 is joined to the first cross member 56 at the front end thereof so that the second cross member also extends rearwardly from the outer end of the front arm portion but at a rearward inclination relative to the first cross member 56. The second cross member is thus spaced apart from the first cross member at the rear end thereof while lying in a common plane with the front and rear arm portions respectively. The rear end of the second cross member 58 terminates in proximity to the rear side of the brace member. A second rear arm portion 60 is connected laterally between the rear ends of the first and second cross members at the rear side of the brace member.

A first latching element 62 is fixed on the rear side of the brace member adjacent the outer end of the second arm portion 60. The first latching element 62 comprises a vertical plate which is parallel to the forward working direction in the latched position. A slot 64 is formed in the plate which extends upwardly from a bottom edge of the plate so that the slot opens downwardly and such that a rear edge of the vertical plate forming the first latching element defines a hook portion 66.

A second latching element 68 is mounted on the front side of each wing frame section for latching engagement with the respective one of the first latching elements 62. Each second latching element comprises a horizontal pin 70 supported parallel and spaced forwardly from the front beam 16 of the respective frame section as supported by a pair of parallel mounting plates 72. The two mounting plates 72 are mounted at laterally spaced positions at the front side of the front beam 16 to project forwardly therefrom at laterally spaced positions. The pin 70 is coupled between the two mounting plates.

In the latched position, the pin 70 is received within the slot 64 of the first latching element such that the hook portion 66 of the first latching element is in turn received downwardly through the space between the pin 70 and the front side of the corresponding front beam 16. The pin fits snugly into the respective slot 64 and the hook portion fits snugly within the respective space between the pin 70 and the front side of the front beam 16 such that the latching connection between the first latching element and the second latching element forms a substantially non-rotatable latched connection therebetween. The second latching element remains latched upon the first latching element solely by downward pressure applied to the brace member as described in further detail below. The slot 64 otherwise remains open at the bottom side thereof in the latched position such that subsequent releasing of the brace member from the latched position simply requires upward pivoting of the brace member about the respective brace axis.

The pivoting of the brace member between latched and released position is controlled by a respective hydraulic actuator 74. Each hydraulic actuator comprises a piston received within a corresponding cylinder so as to be linearly extendable in a longitudinal direction from a retracted position to an extended position. In the illustrated embodiment, the piston end 76 is pivotally coupled to a corresponding lug 78 extending upwardly from the front arm portion of the respective brace member in the latched position thereof.

The opposing cylinder end 80 of each actuator 74 is operatively connected to the center frame section at a location spaced inwardly from the end member at the lateral side of the center frame section, as well as being spaced laterally inward from the brace axis of the respective brace member. When the hydraulic actuator is fully extended into the extended position, the brace member is pivoted downwardly and laterally outwardly into the latched position. Alternatively, when the actuator 74 is fully retracted, the corresponding brace member is pivoted upwardly and laterally inwardly towards the released position.

The cylinder end 80 of each actuator is coupled to the respective center frame section by a respective biasing linkage 82. The linkage 82 is coupled in series between the actuator and the center frame section and is arranged to be varied in length in the longitudinal direction of the actuator for varying the overall combined length of the biasing linkage and actuator together even when the actuator remains locked in the fully extended position thereof as described in further detail below.

Each biasing linkage 82 includes a housing element 84 comprising an enclosed cylinder having a hollow interior. The housing element is mounted in fixed relation to the center frame section with a longitudinal axis of the cylinder being aligned with the longitudinal axis of the corresponding hydraulic actuator.

The biasing linkage 82 further includes a sliding element 86 comprising a tie rod having a shaft portion which is slidably received through an opening at the outer end of the housing element 84. An internal end of the sliding element is enlarged in diameter o be greater in dimension than the opening through which the shaft portion is slidably received such that the internal end of the sliding element defines a stop 88 which retains the inner end of the sliding element within the housing element throughout the longitudinal displacement of the sliding element relative to the housing element. The stop 88 also functions substantially as a piston relative to the housing element 84.

In this manner, the sliding element 86 is linearly extendable in length in the longitudinal direction of the actuator between a first position of shortest length to a second position in which a sliding element is displaced outwardly from the housing element by a maximum displacement corresponding to a maximum overall length of the biasing linkage.

The biasing linkage further includes a spring element 90 which is mounted under compression between the inner end of the sliding element and the terminal end of the housing element 84. The spring element thus provides a biasing force which acts in the linear sliding direction of the biasing linkage and in the longitudinal direction of the associated actuator 74 to bias the biasing linkage from the first position to the second position. The biasing linkage is thus biased in the longitudinal direction towards a position corresponding to the overall effective length of the combined biasing linkage and hydraulic actuator being increased from the first position to the second position of the biasing linkage. The direction of biasing thus corresponds to a biasing force acting in the latching direction of the brace from the released position towards the latched position thereof. The biasing force of the spring element 90 thus acts in a direction to maintain positive pressure on the second latching element to remain engaged with the first latching element.

Figure 5:
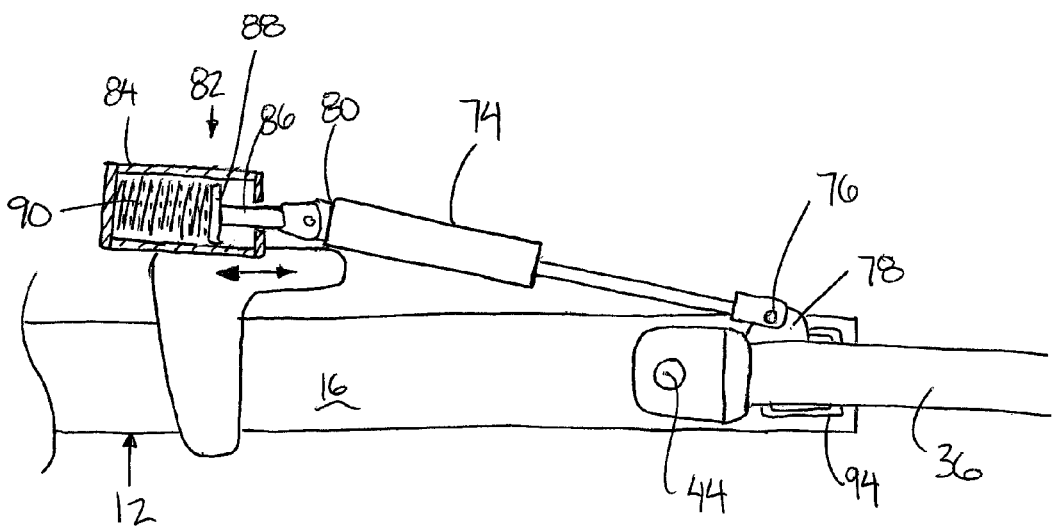
FIG. 5 is a front elevational view of the brace portion according to FIG. 4 in a released position.
Figure 6:
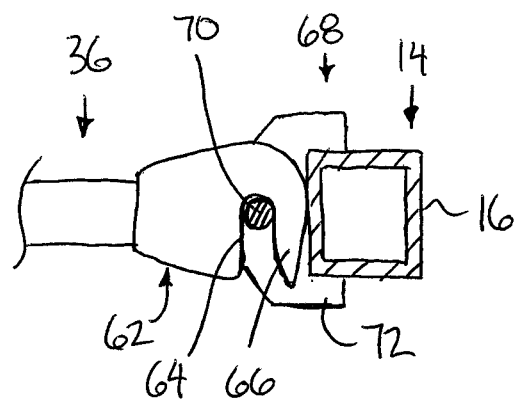
FIG. 6 is a sectional view along the line 6-6 of FIG. 3.
Figure 7:
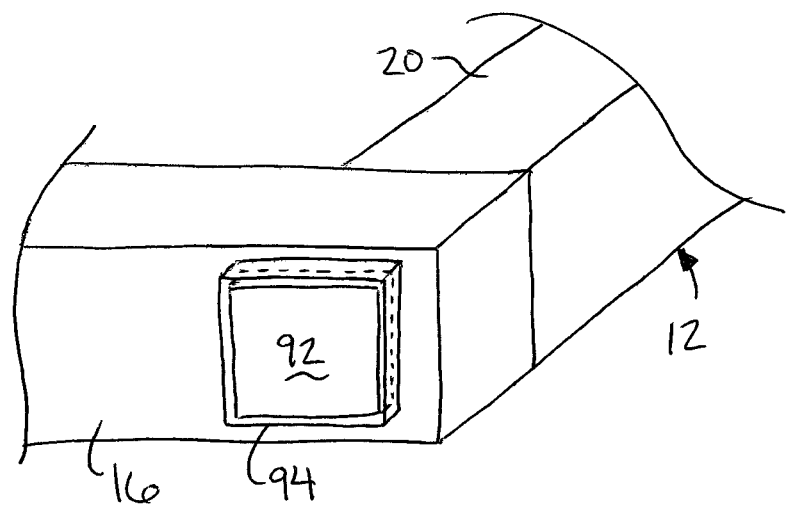
FIG. 7 is an enlarged perspective view of a front corner of the central frame portion of the implement.

When all of the frame sections are level with one another at a common horizontal elevation such that the bottoms of all the rollers are coplanar with one another and the brace members are both in their latched positions with the respective hydraulic actuators in their fully extended conditions, the biasing linkage is arranged such that the sliding element 86 is at a centered position relative to the first and second positions thereof as shown in FIG. 5. More particularly in this instance the biasing linkage is arranged such that the spring element is compressed by approximately half of its overall compression range.

From this center position any upward or downward deflection of the respective wing sections relative to the center frame section causes the biasing linkage to either undergo further compression or less compression while maintaining positive biasing force to retain the second latching element engaged within the first latching element throughout the range of motion of the wing section relative to the center frame section. Accordingly no additional locking or latching element is required to retain the second latching element engaged within the first latching element.

More particularly upward deflection of either wing section relative to the center frame section causes the overall length of the combined biasing linkage and hydraulic actuator to be shortened such that the spring element is further compressed to shorten the biasing linkage from the centered position towards the first position. Alternatively when one of the wing sections is deflected downwardly relative to the center frame section, the overall combined length of the hydraulic actuator in the fully extended position with the biasing linkage is increased such that the biasing linkage is displaced from the centered position to the second position while the spring element continues to apply biasing force in the latching direction.

To minimize wear between the rear side of the front arm portion of each brace member and the front side of the front beam of the center frame section immediately rearward thereof, an additional wear plate 92 can be provided in association with each brace member. More particularly, the wear plate comprises a flat panel of plastic material having a low coefficient of friction which is mounted in fixed relation against the front facing side of the front beam of the center frame section in proximity to the outer end thereof so as to be aligned with the brace member in the latched position thereof. More particularly, the wear plate is positioned in a lateral direction between the brace axis of the respective brace member and the corresponding one of the laterally opposing sides of the center frame section. In the latched position of the brace member, the drag of the wing frame sections as the implement is towed in the forward working direction applies a rearward force to the brace member which in turn results in the front arm portion 48 being pulled rearwardly against the front side of the corresponding front beam of the center frame section locating the wear plate thereon. The wear plate is thus engaged under compression between the front arm portion of the brace member and the center frame section in use. Additional support to the wear plate 92 is provided by a metallic mounting strip 94 fixed by welding to the front beam of the frame and extending about a full perimeter of the wear plate. The perimeter mounting strip 94 provides peripheral support to the wear plate to support against relative up and down movement and lateral side-to-side movement due to relative movement of the brace member relative to the center frame section in use.

When the wing frame sections are initially in the transport position and the brace members are in the released position, the user initially pivots the wing framed sections into their respective working positions, typically by rearward displacement of the implement across the ground. Once the wing sections are in the working position, the hydraulic actuators are extended from their retracted position to their fully extended position which results in the second latching elements being pivoted into the first latching elements into latching engagement therewith.

Typically, because the spring element of the corresponding biasing linkage is biased towards the maximum length, the second latching element will actually engage within the first latching element before the actuator reaches its fully extended position. Continued extension of the actuator into its fully extended position thus results in partial compression of the biasing linkage towards the centered position thereof, for example if the wing sections are on horizontal level ground relative to the center frame section. The hydraulic actuators are then locked to remain in their fully extended position.

As the implement is used during towing movement in the forward working direction across the field, any upward and downward displacement of the wing sections relative to the center frame section causes the brace members to pivot about the same floating axis as the wing sections while the latching elements remain engaged due to the positive pressure applied by the biasing linkage 82.

In an alternative embodiment, the hydraulic actuators may be mounted in an arrangement where retraction of the actuators causes the brace members to be pivoted into their latched position. In this instance, the biasing linkage is arranged so that the spring element instead provides a biasing force from the second position of maximum length towards the first position of minimum length. In either instance, the biasing linkage is oriented in a manner which provides biasing force in a direction which corresponds to the latching direction of the second latching elements being displaced from the released position to a latched position thereof to maintain positive latching pressure throughout floating movement of the wing frame section relative to the center frame section. In either embodiment, a pair of operating linkages are defined by the combination of each hydraulic actuator 74 and the associated biasing linkage 82 in which the operating linkages are operatively connected between the center frame section and respective ones of the brace members so as to be operable to vary an overall length of the operating linkage in a longitudinal direction of the operating linkage to pivot the brace members relative to the center frame section between the latched position and the released position. Each operating linkage includes (i) the respective hydraulic actuator operable in the longitudinal direction of the operating linkage between a retracted position and an extended position in which a length of the hydraulic actuator in the longitudinal direction of the operating linkage between opposing ends of the hydraulic actuator is greater in the extended position than in the retracted position; and (ii) the respective biasing linkage coupled with the hydraulic actuator and being operable between a first position and a second position in which a length of the biasing linkage in the longitudinal direction of the operating linkage between opposing ends of the biasing linkage is greater in the second position than in the first position. Within each operating linkage, the hydraulic actuator and the biasing linkage are coupled longitudinally end to end with one another such that an overall length of the operating linkage in the longitudinal direction of the operating linkage between the center frame section and the respective brace member corresponds to a combined length of the length of the hydraulic actuator and the length of the biasing linkage. In this manner, either one of the hydraulic actuator and the biasing linkage is adjustable in the length thereof so as to vary the overall length of the operating linkage independently of the length of the other one of the hydraulic actuator and the biasing member. Each operating linkage is further configured such that: (i) locating the hydraulic actuator in one of the extended position or the retracted position corresponds to the brace member being located in the latched position; (ii) locating the hydraulic actuator in another one of the extended position or the retracted position corresponds to the brace member being located in the released position; (iii) the brace members are pivotal relative to the center frame section together with pivotal movement of the wing sections relative to the center frame section while the brace members remain in the latched position by varying the length of the biasing linkages while the hydraulic actuators remain in said one of the extended position or the retracted position thereof; and (iv) each biasing linkage is biased from one of the first position or the second position towards another one of the first position or the second position in a direction such that the respective brace member is biased towards the latched position.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A winged agricultural implement arranged to be towed in a forward working direction by a towing vehicle, the implement comprising:

a center frame section arranged for connection to the towing vehicle;

a pair of wing frame sections having respective inner ends which are pivotally coupled at laterally opposing sides of the center frame section for movement between a working position extending laterally outwardly in opposing directions from the center frame section and a transport position trailing rearwardly from the center frame section, each wing frame section being pivotal relative to the center frame section in the working position thereof about a floating axis oriented generally in the forward working direction;

at least one ground engagement member supported on each frame section so as to be arranged to engage the ground as the implement is towed in the forward working direction;

a pair of brace members pivotally supported on the center frame section at the laterally opposing sides respectively;

a pair of first latching elements supported on respective ones of the brace members;

a pair of second latching elements supported on respective ones of the wing frame sections so as to be arranged to be selectively engaged by the first latching element of the respective brace member;

a pair of operating linkages operatively connected between the center frame section and respective ones of the brace members so as to be operable to vary an overall length of the operating linkage in a longitudinal direction of the operating linkage to pivot the brace members relative to the center frame section between:
  (i) a latched position of the brace members in which the respective first and second latching elements are engaged with one another to retain the respective wing frame sections in the working position; and
  (ii) a released position of the brace members in which the first latching elements are released from the second latching elements respectively such that the respective wing frame sections are pivotal from the working position to the transport position;

each operating linkage comprising:
  (i) a hydraulic actuator operable in the longitudinal direction of the operating linkage between a retracted position and an extended position in which a length of the hydraulic actuator in the longitudinal direction of the operating linkage between opposing ends of the hydraulic actuator is greater in the extended position than in the retracted position; and
  (ii) a biasing linkage coupled with the hydraulic actuator and being operable between a first position and a second position in which a length of the biasing linkage in the longitudinal direction of the operating linkage between opposing ends of the biasing linkage is greater in the second position than in the first position;
  (iii) the hydraulic actuator and the biasing linkage being coupled longitudinally end to end with one another such that an overall length of the operating linkage in the longitudinal direction of the operating linkage between the center frame section and the respective brace member corresponds to a combined length of the length of the hydraulic actuator and the length of the biasing linkage; and
  (iv) either one of the hydraulic actuator and the biasing linkage being adjustable in the length thereof so as to vary the overall length of the operating linkage independently of the length of the other one of the hydraulic actuator and the biasing member;

the operating linkage being configured such that:
  (i) locating the hydraulic actuator in one of the extended position or the retracted position corresponds to the brace member being located in the latched position;
  (ii) locating the hydraulic actuator in another one of the extended position or the retracted position corresponds to the brace member being located in the released position;
  (iii) the brace members are pivotal relative to the center frame section together with pivotal movement of the wing sections relative to the center frame section while the brace members remain in the latched position by varying the length of the biasing linkages while the hydraulic actuators remain in said one of the extended position or the retracted position thereof; and
  (iv) each biasing linkage is biased from one of the first position or the second position towards another one of the first position or the second position in a direction such that the respective brace member is biased towards the latched position.

2. The implement according to claim 1 wherein each biasing linkage comprises a sliding element which is linearly slidable between the first position and the second position of the biasing linkage.

3. The implement according to claim 1 wherein each biasing linkage is linearly slidable in the longitudinal direction of the respective hydraulic actuator.

4. The implement according to claim 1 wherein each brace member is in the latched position in the extended position of the respective hydraulic actuator, and each biasing linkage is biased from the first position towards the second position thereof.

5. The implement according to claim 1 wherein each biasing linkage includes a spring element which is oriented to provide biasing force in the longitudinal direction of the respective hydraulic actuator.

6. The implement according to claim 1 wherein each biasing linkage is substantially centered at a central position between the first and second positions in the latched position of the brace members when the wing frame sections are level with the center frame section at a common horizontal elevation so as to be adapted to retain the brace members in the latched position while allowing deflection of the brace members in two opposing directions from the central position of the biasing linkage.

7. The implement according to claim 1 wherein each wing frame section is pivotal relative to the center frame section in the working position thereof about a floating axis oriented generally in the forward working direction, and wherein each hydraulic actuator is arranged to be locked in the extended position in the latched position of the brace members as the wing frame sections are pivotally displaced relative the center section about the respective floating axes.

8. The implement according to claim 1 wherein the extended position of each hydraulic actuator corresponds to the actuator being fully extended.

9. The implement according to claim 1 wherein each brace member is pivotal relative to the center frame section about a brace axis which is coaxial with the floating axis of the respective wing frame section.

10. The implement according to claim 1 wherein each first latching element is arranged to engage the respective second latching element non-rotatably in the latched position of the respective brace member.

11. The implement according to claim 1 wherein one of the first latching elements and the second latching elements comprise pins and another one of the first latching elements and the second latching elements comprise slots which receive the pins therein in the latched position of the brace members.

12. The implement according to claim 11 wherein each pin is retained in the respective slot in the latched position of the respective brace member solely by a biasing provided by the respective biasing linkage.

13. The implement according to claim 1 wherein each biasing linkage comprises a housing element, a sliding element which is supported for linear sliding movement relative to the housing element, and a spring element coupled between the housing element and the sliding element so as to provide biasing force to the sliding element in a direction of the linear sliding movement, the spring element being fully enclosed within the housing element.

14. The implement according to claim 1 wherein each biasing linkage is mounted between the respective hydraulic actuator and the center frame section.

15. The implement according to claim 1 wherein each brace member in the latched position comprises:
   a front arm portion extending laterally outwardly from an inner end of the front arm portion pivotally coupled to the center frame section at a front side of the center frame section;
   a rear arm portion extending laterally outwardly from an inner end of the rear arm portion pivotally coupled to the center frame section at a rear side of the center frame section; and
   at least one cross member joined between the front arm portion at a front side of the brace member and the rear arm portion at a rear side of the brace member such that the front arm portion and the rear arm portion are pivotal together relative to the center frame section about a common brace axis of the brace member;
   and wherein the implement further comprises a wear plate formed of non-metallic material associated with each brace member, the wear plate being mounted on one of the center frame section or the front arm portion of the respective brace member so as to be oriented transversely to the forward working direction in engagement between the center frame section and the front arm portion in the latched position.

16. The implement according to claim 1 wherein said at least one ground engagement member comprises a roller arranged to level ground such that the winged agricultural implement comprises a land roller implement.

17. A winged agricultural implement arranged to be towed in a forward working direction by a towing vehicle, the implement comprising:
   a center frame section arranged for connection to the towing vehicle;
   a pair of wing frame sections having respective inner ends which are pivotally coupled at laterally opposing sides of the center frame section for movement between a working position extending laterally outwardly in opposing directions from the center frame section and a transport position trailing rearwardly from the center frame section, each wing frame section being pivotal relative to the center frame section in the working position thereof about a floating axis oriented generally in the forward working direction;
   at least one ground engagement member supported on each frame section so as to be arranged to engage the ground as the implement is towed in the forward working direction;
   a pair of brace members pivotally supported on the center frame section at the laterally opposing sides respectively so as to be associated with the pair of wing frame sections respectively, each brace member being pivotal relative to the center frame about a respective brace axis which is coaxial with the floating axis of the respective wing frame section;
   a pair of first latching elements supported on respective ones of the brace members;
   a pair of second latching elements supported on respective ones of the wing frame sections so as to be arranged to be selectively engaged by the first latching element of the respective brace member;
   a pair of hydraulic actuators each hydraulic actuator being operable in a respective longitudinal direction of the hydraulic actuator between an extended position and a retracted position, wherein the hydraulic actuators are operatively connected between the center frame section and respective ones of the brace members so as to be operable to pivot the brace members relative to the center frame section between:
      a latched position of the brace members in which the respective first and second latching elements are engaged with one another to retain the respective wing frame sections in the working position, the latched position corresponding to the hydraulic actuators being in one of the extended position or the retracted position; and
      a released position of the brace members in which the first latching elements are released from the second latching elements respectively such that the respective wing frame sections are pivotal from the working position to the transport position, the released position corresponding to the hydraulic actuators being in another one of the extended position or the retracted position; and
   a pair of biasing linkages associated with the hydraulic actuators respectively, wherein:
      each biasing linkage is connected in series with the respective hydraulic actuator between the center frame section and the respective brace member;
      each biasing linkage is operable between a first position and a second position in which an overall effective length of the biasing linkage and the hydraulic actuator between the center frame section and the respective brace member is longer in the second position than in the first position while the brace members remain in the latched position corresponding to the hydraulic actuators remaining in said one of the extended position or the retracted position thereof;
      the brace members are pivotal relative to the center frame section together with pivotal movement of the wing frame sections relative to the center frame section while the brace members remain in the latched position corresponding to the hydraulic actuators remaining in said one of the extended position or the retracted position thereof; and
      each biasing linkage is biased from one of the first position or the second position towards another one of the first position or the second position in a direction such that the respective brace member is biased towards the latched position.

18. A winged agricultural implement arranged to be towed in a forward working direction by a towing vehicle, the implement comprising:

a center frame section arranged for connection to the towing vehicle;

a pair of wing frame sections having respective inner ends which are pivotally coupled at laterally opposing sides of the center frame section for movement between a working position extending laterally outwardly in opposing directions from the center frame section and a transport position trailing rearwardly from the center frame section, each wing frame section being pivotal relative to the center frame section in the working position thereof about a floating axis oriented generally in the forward working direction;

at least one ground engagement member supported on each frame section so as to be arranged to engage the ground as the implement is towed in the forward working direction;

a pair of brace members pivotally supported on the center frame section at the laterally opposing sides respectively;

a pair of first latching elements supported on respective ones of the brace members;

a pair of second latching elements supported on respective ones of the wing frame sections so as to be arranged to be selectively engaged by the first latching element of the respective brace member;

a pair of operating linkages operatively connected between the center frame section and respective ones of the brace members so as to be operable to vary an overall length of the operating linkage in a longitudinal direction of the operating linkage to pivot the brace members relative to the center frame section between:

(i) a latched position of the brace members in which the respective first and second latching elements are engaged with one another to retain the respective wing frame sections in the working position; and (ii) a released position of the brace members in which the first latching elements are released from the second latching elements respectively such that the respective wing frame sections are pivotal from the working position to the transport position;

each operating linkage comprising:

(i) a hydraulic actuator operable in the longitudinal direction of the operating linkage between a retracted position and an extended position in which a length of the hydraulic actuator in the longitudinal direction of the operating linkage between opposing ends of the hydraulic actuator is greater in the extended position than in the retracted position; and (ii) a biasing linkage coupled with the hydraulic actuator and being operable between a first position and a second position in which a length of the biasing linkage in the longitudinal direction of the operating linkage between opposing ends of the biasing linkage is greater in the second position than in the first position;

(iii) the hydraulic actuator and the biasing linkage being coupled longitudinally end to end with one another such that an overall length of the operating linkage in the longitudinal direction of the operating linkage between the center frame section and the respective brace member corresponds to a combined length of the length of the hydraulic actuator and the length of the biasing linkage; and (iv) either one of the hydraulic actuator and the biasing linkage being adjustable in the length thereof so as to vary the overall length of the operating linkage independently of the length of the other one of the hydraulic actuator and the biasing member;

the operating linkage being configured such that:

(i) locating the hydraulic actuator in one of the extended position or the retracted position corresponds to the brace member being located in the latched position;

(ii) locating the hydraulic actuator in another one of the extended position or the retracted position corresponds to the brace member being located in the released position;

(iii) the brace members are pivotal relative to the center frame section together with pivotal movement of the wing sections relative to the center frame section while the brace members remain in the latched position by varying the length of the biasing linkages while the hydraulic actuators remain in said one of the extended position or the retracted position thereof; and (iv) each biasing linkage is biased from one of the first position or the second position towards another one of the first position or the second position in a direction such that the respective brace member is biased towards the latched position; and each first latching element remains engaged with the respective second latching element as the brace members are pivoted relative to the center frame section together with the pivotal movement of the respective wing frame sections solely by a biasing provided by the respective biasing linkage while the hydraulic actuators remain in said one of the extended position or the retracted position thereof.

\* \* \* \* \*